United States Patent
Yu et al.

(10) Patent No.: US 11,917,043 B2
(45) Date of Patent: Feb. 27, 2024

(54) DATA TRANSMISSION METHOD AND APPARATUS

(71) Applicant: Spreadtrum Communications (Shanghai) Co., Ltd., Shanghai (CN)

(72) Inventors: Zhongxing Yu, Shanghai (CN); Guochu Chen, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 57 days.

(21) Appl. No.: 17/741,504

(22) Filed: May 11, 2022

(65) Prior Publication Data

US 2022/0272180 A1     Aug. 25, 2022

Related U.S. Application Data

(63) Continuation of application No. PCT/CN2019/117190, filed on Nov. 11, 2019.

(51) Int. Cl.
  *G06F 15/173*     (2006.01)
  *H04L 69/22*      (2022.01)
  *H04L 5/00*       (2006.01)
  *H04W 72/0446*    (2023.01)

(52) U.S. Cl.
  CPC ........... *H04L 69/22* (2013.01); *H04L 5/0048* (2013.01); *H04W 72/0446* (2013.01)

(58) Field of Classification Search
  CPC ... H04L 69/22; H04L 5/0048; H04W 72/0446
  See application file for complete search history.

(56) References Cited

U.S. PATENT DOCUMENTS

| | | | |
|---|---|---|---|
| 2006/0035589 A1* | 2/2006 | Shvodian | H04L 1/1858 455/18 |
| 2011/0134827 A1* | 6/2011 | Hooli | H04W 48/08 370/329 |
| 2014/0119271 A1* | 5/2014 | Wong | H04L 1/0003 370/315 |
| 2018/0255576 A1* | 9/2018 | Bhorkar | H04W 74/0808 |
| 2019/0014526 A1* | 1/2019 | Bader | H04L 69/22 |
| 2019/0037312 A1  | 1/2019 | Watson et al. | |
| 2020/0053706 A1* | 2/2020 | Sadeghi | H04W 72/30 |
| 2020/0351669 A1* | 11/2020 | Xu | H04W 74/0808 |
| 2021/0153033 A1* | 5/2021 | Peleg | H04W 52/0219 |

FOREIGN PATENT DOCUMENTS

| | | |
|---|---|---|
| CN | 104902503 A | 9/2015 |
| CN | 109314813 A | 2/2019 |
| CN | 109391926 A | 2/2019 |
| CN | 109587666 A | 4/2019 |

\* cited by examiner

*Primary Examiner* — Siren Wei
(74) *Attorney, Agent, or Firm* — Kilpatrick Townsend & Stockton LLP

(57) ABSTRACT

Embodiments of the present disclosure provide a data transmission method, including: a first device receiving a data packet in a first slot, where the data packet is noise or a data packet received from a data source device; the first device determining a link state between the data source device and the first device according to the data packet, where the link state comprising an idle state or a busy state; and the first device transmitting audio data to a second device in the first slot when determining the link state being the idle state, where the audio data is audio data received by the first device from the data source device.

14 Claims, 7 Drawing Sheets

S405. Transmitting an identifier of a current data frame to the second device

S406. The second device receives the identifier of the current data frame, and transmits listening information to the first device, where the listening information is used to indicate a receiving state of the second device for N data frames, the N data frames include the current data frame, and N-1 data frames that are positioned before the current data frame and are closest to the current data frame, the receiving state is a successful reception or a failed reception, and N is an integer greater than or equal to 1

S407. Receiving the listening information transmitted by the second device, and determining a data frame that is not listened by the second device based on the listening information S408. Transmitting to the second device, in the first slot, the data frame that is not listened by the second device

FIG. 4B

DATA TRANSMISSION METHOD AND APPARATUS

CROSS-REFERENCE TO RELATED APPLICATION

This application is a continuation of International Application No. PCT/CN2019/117190 filed on Nov. 11, 2019, which is incorporated by reference herein.

TECHNICAL FIELD

Embodiments of the present disclosure relates to the field of wireless communications and, in particular, to a data transmission method and apparatus.

BACKGROUND

An electronic device (such as a mobile phone, a computer, or the like) generally can be connected to at least one earphone, which transmits an audio packet to the at least one earphone. The at least one earphone can convert the audio packet into audio audible by a user, so that the user can hear the audio during a process where the earphone is worn.

SUMMARY

Embodiments of the present disclosure provide a data transmission method and apparatus.

In a first aspect, an embodiment of the present disclosure provides a data transmission method applied to a first device in an audio device group, where the first device is in a wireless connection with a data source device and a second device respectively, the second device is a device other than the first device in the audio device group, and the method includes:
  receiving, by the first device, a data packet in a first slot, where the data packet is noise or a data packet received from the data source device;
  determining, by the first device, a link state between the data source device and the first device based on the data packet, where the link state comprising an idle state or a busy state; and
  transmitting, by the first device, audio data to the second device in the first slot when determining the link state being the idle state, where the audio data is audio data received by the first device from the data source device.

In a second aspect, an embodiment of the present disclosure provides a data transmission apparatus, including: a processor and a memory;
  where the memory is configured to store computer-executable instructions; and
  the processor is configured to execute the computer-executable instructions stored in the memory, so that the processor executes the method according to any item of the first aspect as described above.

In a third aspect, an embodiment of the present disclosure provides a computer readable storage medium having stored therein computer-executable instructions, where the method according to any item of the first aspect as described above is implemented when the computer-executable instructions are executed by a processor.

Embodiments of the present disclosure provide a data transmission method and apparatus. The method includes: a first device receiving a data packet in a first slot, where the data packet is noise or a data packet received from a data source device; the first device determining a link state between the data source device and the first device based on the data packet, where the link state comprising an idle state or a busy state; and the first device transmitting audio data to a second device in the first slot when determining the link state being the idle state, where the audio data is audio data received by the first device from the data source device.

BRIEF DESCRIPTION OF DRAWINGS

FIGS. 4A and 4B are a third schematic flowchart of a data transmission method according to an embodiment of the present disclosure;

DESCRIPTION OF EMBODIMENTS

In order to describe objectives, technical solutions, and advantages of the embodiments of the present disclosure more clearly, the technical solutions in the embodiments of the present disclosure will be described hereunder clearly and comprehensively with reference to accompanying drawings in the embodiments of the present disclosure. Apparently, the described embodiments are only a part of embodiments of the present disclosure, rather than all embodiments of the present disclosure. All other embodiments obtained by persons of ordinary skill in the art based on the embodiments of the present disclosure without any creative effort shall fall into the protection scope of the present disclosure.

In the related art, after a primary earphone is determined from at least one earphone, an electronic device transmits an audio packet to the primary earphone; and after the primary earphone receives the audio packet, the primary earphone transmits the audio packet to a secondary earphone. In the above-described process, the primary earphone, when transmitting the audio packet to the secondary earphone, cannot receive another audio packet transmitted by the electronic device to the primary earphone. Therefore, there would be a waste of time for the primary earphone's normal communications with the electronic device in transmitting the audio packet to the secondary earphone, which in turn results in less efficient communications between the primary earphone and the electronic device.

Figure 1:
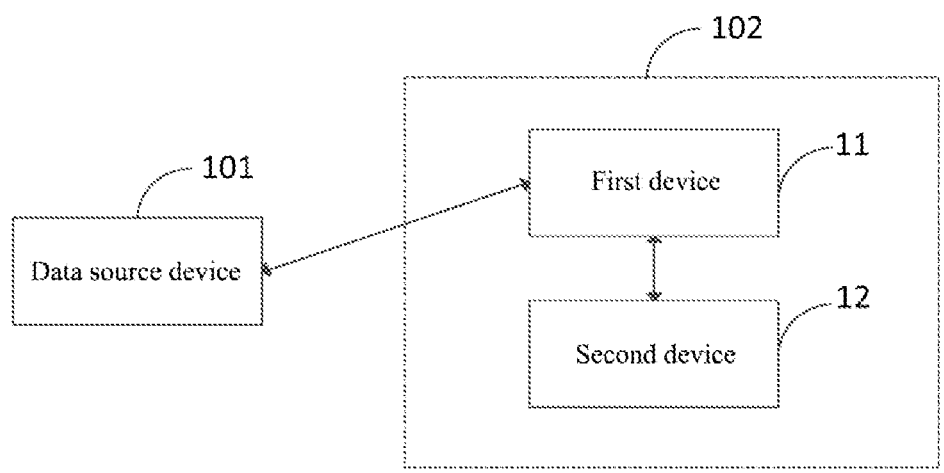
FIG. 1 is a schematic diagram illustrating an application scenario of a data transmission method according to an embodiment of the present disclosure.

FIG. 1 is a schematic diagram illustrating an application scenario of a data transmission method according to an embodiment of the present disclosure. As shown in FIG. 1, a data source device 101 and an audio device group 102 are included, where the audio device group 102 includes a first device 11 and a second device 12.

In an embodiment, the data source device 101 may be a smart phone or a tablet computer.

In an embodiment, both the first device 11 and the second device 12 are wireless transceiver devices, such as earphones, speakers or the like.

In an embodiment, the data source device 101 may interact with the first device 11 in a wireless transmission mode, and the first device may interact with the second device 12 in a wireless transmission mode. The wireless transmission mode may be Bluetooth, wireless fidelity (WIFI for short) or the like. It should be noted that, reference may be made to the embodiments in FIG. 2 for a detailed description of the first device and the second device, and detailed explanations are omitted here.

In a practical application, after a communication link is established between the data source device 101 and the first device 11, the data source device 101 interacts with the first device 11. For example, after receiving a data packet transmitted by the data source device 101 in a first slot, the first device 11 may determine a link state of the above-mentioned communication link based on the data packet. After determining the link state being an idle state, the first device 11 interacts with the second device 12.

For example, after the first device determines the link state being the idle state, the first device may transmit, to the second device, in the first slot, audio data received in a previous slot. For example, when the link state is a busy state, the first device receives, in the first slot, the data packet transmitted by the data source device, instead of transmitting the audio data received in the previous slot to the second device. In the above-mentioned process, the first device transmits the audio data to the second device in the first slot. Therefore, there would be no waste of time for the first device's normal communications with the data source device in transmitting the audio data to the second device, thereby improving efficiency of communications between the first device and the data source device and transmission efficiency for audio data transmission to the second device by the first device.

Hereinafter, the technical solutions shown in the present disclosure will be described in detail through specific embodiments. It should be noted that the following specific embodiments may be combined with each other, and for same or similar contents, repetitions will be omitted in different embodiments.

Figure 2:
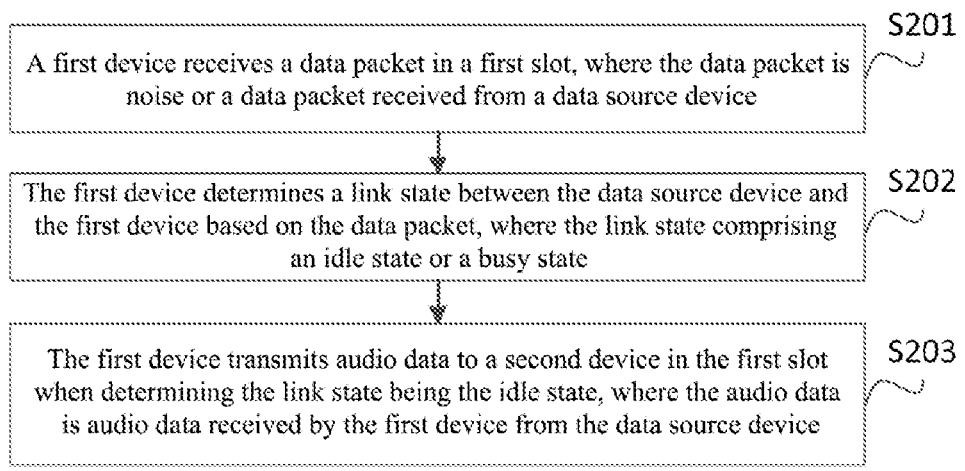
FIG. 2 is a first schematic flowchart of a data transmission method according to an embodiment of the present disclosure.

Specifically, description is made by taking an example where the audio device group includes two devices (the first device and the second device), and the data transmission method according to the present disclosure is described in the embodiments of FIG. 2.

FIG. 2 is a first schematic flowchart of a data transmission method according to an embodiment of the present disclosure. As shown in FIG. 2, the data transmission method includes the following steps.

S201, a first device receives a data packet in a first slot, where the data packet is noise or a data packet received from a data source device.

In an embodiment, the executive subject of the embodiment of the present disclosure may be the first device or a data transmission apparatus provided in the first device, where the data transmission apparatus may be implemented by a combination of software and/or hardware.

In an embodiment, the data packet is noise or a data packet received from the data source device. For example, the noise may be a wireless signal transmitted by another wireless transceiver device other than the data source device that is received by the first device, alternatively, when the data source device does not transmit data to the first device, the first device may also receive noise (such as white Gaussian noise). Further, when the data packet is a data packet received from the data source device, the data packet includes synchronization information and a packet header.

S202, the first device determines a link state between the data source device and the first device based on the data packet, where the link state comprising an idle state or a busy state.

In an embodiment, the link state is a link state between the data source device and the first device in the first slot.

In an embodiment, the first device may determine the link state based on whether the data packet includes synchronization information and a packet header; it may also determine, upon a determination that the data packet includes the synchronization information and the packet header, the link state based on a data packet type in the packet header and/or whether the data packet includes a load.

Figure 3A:
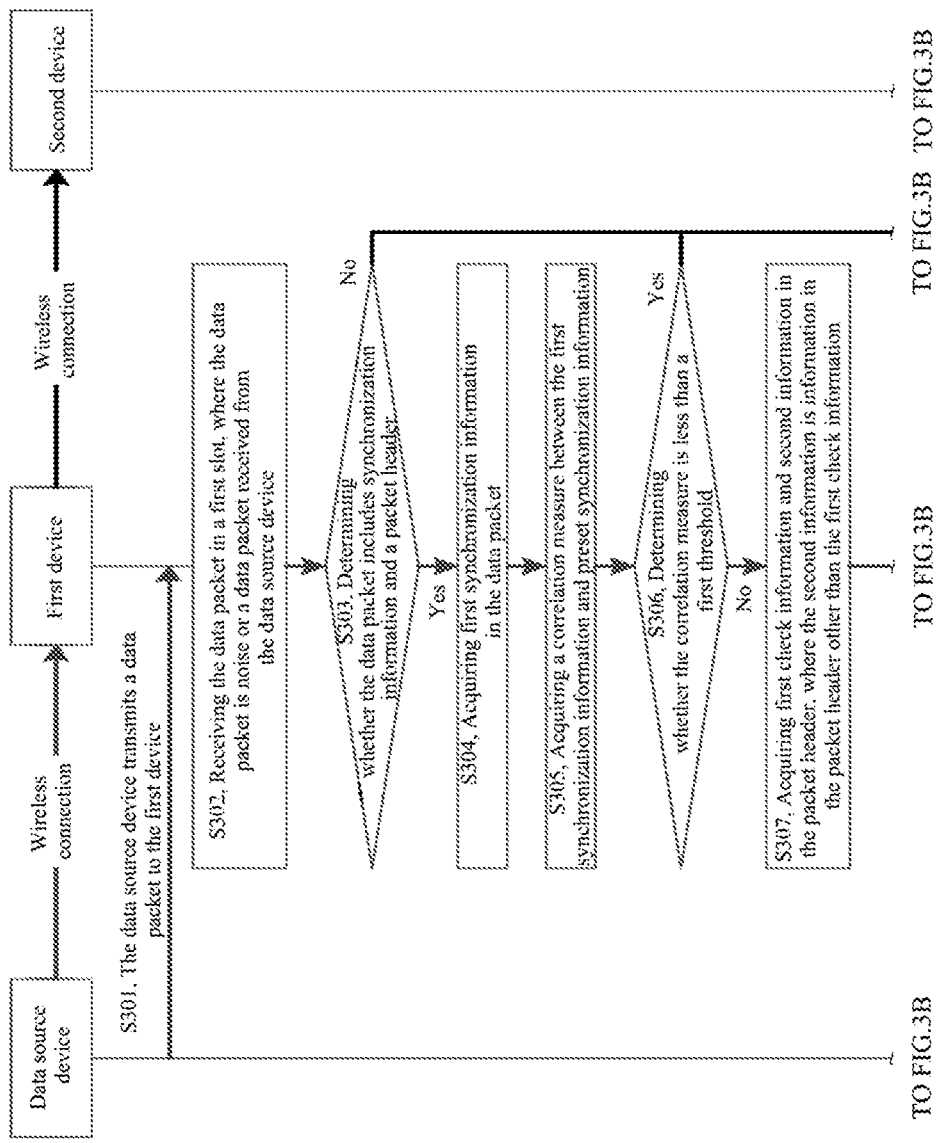
FIGS. 3A and 3B are a second schematic flowchart of a data transmission method according to an embodiment of the present disclosure.
Figure 3B:
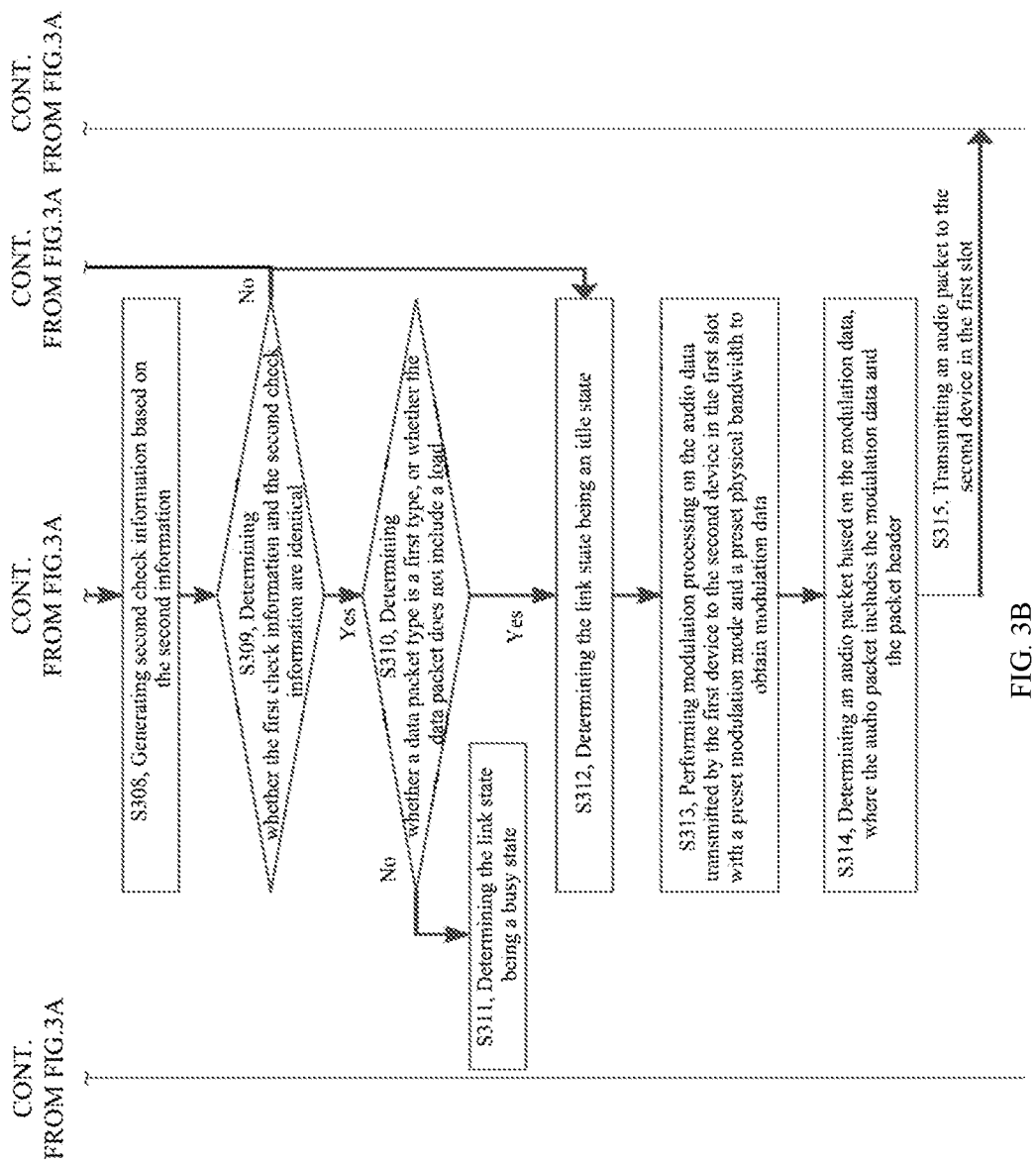

Specifically, for an execution process in which the first device determines the link state between the data source device and the first device based on the data packet, reference may be made to S301 to S312 in an embodiment of FIGS. 3A and 3B. Here, detailed description is omitted.

S203, the first device transmits audio data to a second device in the first slot when determining the link state being the idle state, where the audio data is audio data received by the first device from the data source device.

Specifically, the audio data transmitted by the first device to the second device in the first slot is audio data in a data packet transmitted by the data source device that is received by the first device in a previous slot.

In an embodiment, if the first device is a left channel (or right channel) device and the second device is a right channel (or left channel) device, the audio data transmitted by the first device to the second device in the first slot may be right channel audio data (or left channel audio data) of audio data in a data packet transmitted by the data source device that is received by the first device in a previous slot.

The data transmission method provided in the embodiment of the present disclosure includes: a first device receiving a data packet in a first slot, where the data packet is noise or a data packet received from a data source device; the first device determining a link state between the data source device and the first device based on the data packet, where the link state comprising an idle state or a busy state; and the first device transmitting audio data to a second device in the first slot when determining the link state being the idle state, where the audio data is audio data received by the first device from the data source device. In the above-mentioned process, the first device transmits the audio data to the second device in the first slot when the first device determines the link state being the idle state, so that there would be no waste of time for the first device's normal communications with the data source device in transmitting the audio data to the second device, thereby improving efficiency of communications between the first device and the data source device and transmission efficiency for audio data transmission to the second device by the first device.

FIGS. 3A and 3B are a second schematic flowchart of a data transmission method according to an embodiment of the present disclosure. As shown in FIGS. 3A and 3B, the data transmission method includes the following steps.

S301, a data source device transmits a data packet to a first device.

In an embodiment, the data packet may be a 1-slot packet, a 3-slot packet, a 5-slot packet, or the like.

Among them, the 1-slot packet means that transmission of the data packet consumes 625 microseconds, and the 1-slot packet is generally abbreviated as "2DH1"; the 3-slot packet means that transmission of the data packet consumes 1875 microseconds, which is generally abbreviated as "2DH3"; and the 5-slot packet means that transmission of the data packet consumes 3120 microseconds, which is generally abbreviated as "2DH5".

S302, the first device receives the data packet in a first slot, where the data packet is noise or a data packet received from the data source device.

Specifically, the execution method for S302 is the same as the execution method for S201. Here, detailed description of the execution process of S302 is omitted.

Figure 5:
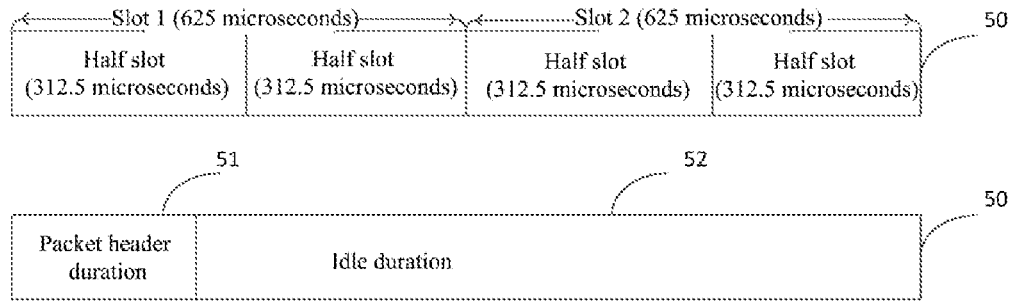
FIG. 5 is a slot structure of a first slot according to an embodiment of the present disclosure.

It should be noted that reference may be made to an embodiment of FIG. 5 for detailed description of the first slot, which will not be described here again.

S303, the first device determines whether the data packet includes synchronization information and a packet header.

If the data packet does not include the synchronization information and the packet header, S312 is executed.

If the data packet includes the synchronization information and the packet header, S304 is executed.

In an embodiment, the first device may perform detection on the data packet based on a preset communication protocol standard, so as to determine whether the data packet includes synchronization information and a packet header. The preset communication protocol standard is a communication protocol standard preset between a audio device group and the data source device.

S304, the first device acquires first synchronization information in the data packet.

Specifically, the first device may also acquire first synchronization information in the packet header of the data packet.

S305, the first device acquires a correlation measure between the first synchronization information and preset synchronization information.

S306, the first device determines whether the correlation measure is less than a first threshold.

If the correlation measure is less than the first threshold, S312 is executed.

If the correlation measure is greater than or equal to the first threshold, S307 is executed.

S307, the first device acquires first check information and second information in the packet header, where the second information is information in the packet header other than the first check information.

S308, the first device generates second check information based on the second information.

S309, the first device determines whether the first check information and the second check information are identical.

If the first check information and the second check information are different, S312 is executed.

If the first check information and the second check information are identical, S310 is executed.

S310, the first device determines whether a data packet type is a first type, or whether the data packet does not include a load.

If the data packet type is the first type, or the data packet does not include the load, S312 is executed.

If the data packet type is a second type or the data packet includes the load, S311 is executed.

In an embodiment, the first type may be any one of: a null packet (NULL) type, a detection packet type, a poll packet (POLL) type, or a noise type.

In an embodiment, the first device determines the link state being an idle state in case of a determination that the data packet type is the first type based on the data packet type in the packet header; alternatively, the first device performs a check on a field included in the data packet, and determines the link state being the idle state upon a determination that there is no field corresponding to the load in the data packet.

S311, the first device determines the link state being a busy state.

Specifically, the link state can be determined to be the busy state upon a determination that the data packet type is a second type or the data packet includes the load.

In an embodiment, the first device determines the link state being the busy state in case of a determination that the data packet type is a second type based on the data packet type in the packet header; alternatively, the first device performs a check on the field in the data packet, and determines the link state being the busy state upon a determination that there is a field corresponding to the load in the data packet.

In an embodiment, when the first device determines the link state being the busy state and the data packet is of the second type, the first device may transmit an acknowledge character (ACK) to the data source device, where the ACK is used to indicate a correct reception by the first device of the data packet transmitted by the data source device.

S312, the first device determines the link state being the idle state.

S313, the first device performs modulation processing on the audio data transmitted by the first device to the second device in the first slot with a preset modulation mode and a preset physical bandwidth to obtain modulation data.

Specifically, the preset modulation mode is quadrature phase shift keying (QPSK) or 8 phase shift keying (8PSK), and the preset physical bandwidth is 2 megahertz with a physical rate of 4 or 6 megabits/second.

In an embodiment, the audio data transmitted may be single-channel audio data or dual-channel audio data.

In a practical application, when the data packet transmitted by the data source device to the first device is "2DH5", the load in the data packet is 670 bytes in size. If the audio data transmitted by the first device to the second device is a single-channel audio data, the single-channel audio data is about 335 bytes in size. In the related art, the first device generally performs modulation processing on the single-channel audio data transmitted to the second device with a modulation bandwidth of 2 megabits/second and a QPSK modulation mode to obtain modulation data; when the first device transmits the modulation data to the second device, the transmission time required is 335*8/2=1.34 milliseconds (ms); the first device may complete the transmission of the modulation data to the second device only through two transmissions since 1.34 ms is greater than 1.25 ms (a duration of one frame). However, in the present disclosure, if the first device performs modulation processing on the single-channel audio data transmitted to the second device with a modulation bandwidth of 4 megabits/second and a QPSK modulation mode to obtain modulation data, the transmission time required is 335*8/4=770 microseconds (us) when the first device transmits the modulation data to the second device; the first device may complete the transmission of the modulation data to the second device through one transmission since 770 us is less than 1.25 ms, thereby reducing the number of times for the first device to transmit data to the second device, and in turn reducing transmission delay.

S314, the first device determines an audio packet based on the modulation data, where the audio packet includes the modulation data and the packet header.

In an embodiment, the first device may perform framing processing on the modulation data and packet header information based on a preset communication protocol standard to obtain an audio packet.

S315, the first device transmits the audio packet to a second device in the first slot.

The data transmission method provided in the embodiment of the present disclosure includes: a data source device transmitting a data packet to a first device; the first device receiving the data packet in a first slot, where the data packet is noise or a data packet received from the data source device; the first device determining whether the data packet includes synchronization information and a packet header; if the data packet does not include the synchronization information and the packet header, the first device determining the link state being the idle state; if the data packet includes the synchronization information and the packet header, the first device acquiring first synchronization information in the data packet; the first device acquiring a correlation measure between the first synchronization information and preset synchronization information; the first device determining whether the correlation measure is less than a first threshold; if the correlation measure is less than the first threshold, the first device determining the link state being the idle state; if the correlation measure is greater than or equal to the first threshold, the first device acquiring first check information and second information in the packet header, where the second information is information in the packet header other than the first check information; the first device generating second check information based on the second information; the first device determining whether the first check information and the second check information are identical, if the first check information and the second check information are different, the first device determining the link state being the idle state; if the first check information and the second check information are identical, the first device determining whether the data packet type is a first type, or whether the data packet does not include a load; if the data packet type is the first type, or the data packet does not include the load, the first device determining the link state being the idle state; if the data packet type is a second type or the data packet includes the load, the first device determining the link state being the busy state; the first device performing modulation processing, on the audio data transmitted by the first device to the second device in the first slot, with a preset modulation mode and a preset physical bandwidth to obtain modulation data; the first device determining an audio packet based on the modulation data, where the audio packet includes the modulation data and the packet header; the first device transmitting the audio packet to the second device in the first slot. In the above-mentioned method, the first device transmits the audio data to the second device in the first slot upon a determination that the link state is the idle state, so that there would be no waste of time for the first device's normal communications with the data source device in transmitting the audio data to the second device, thereby improving efficiency of communications between the first device and the data source device and transmission efficiency for audio data transmission to the second device by the first device. Further, the modulation data in the audio packet transmitted by the first device to the second device is obtained upon modulation processing on the audio data transmitted to the second device with a preset modulation mode and a preset physical bandwidth, thereby reducing the number of times for the first device's complete transmission of the audio packet to the second device, and in turn reducing transmission delay.

Figure 4A:
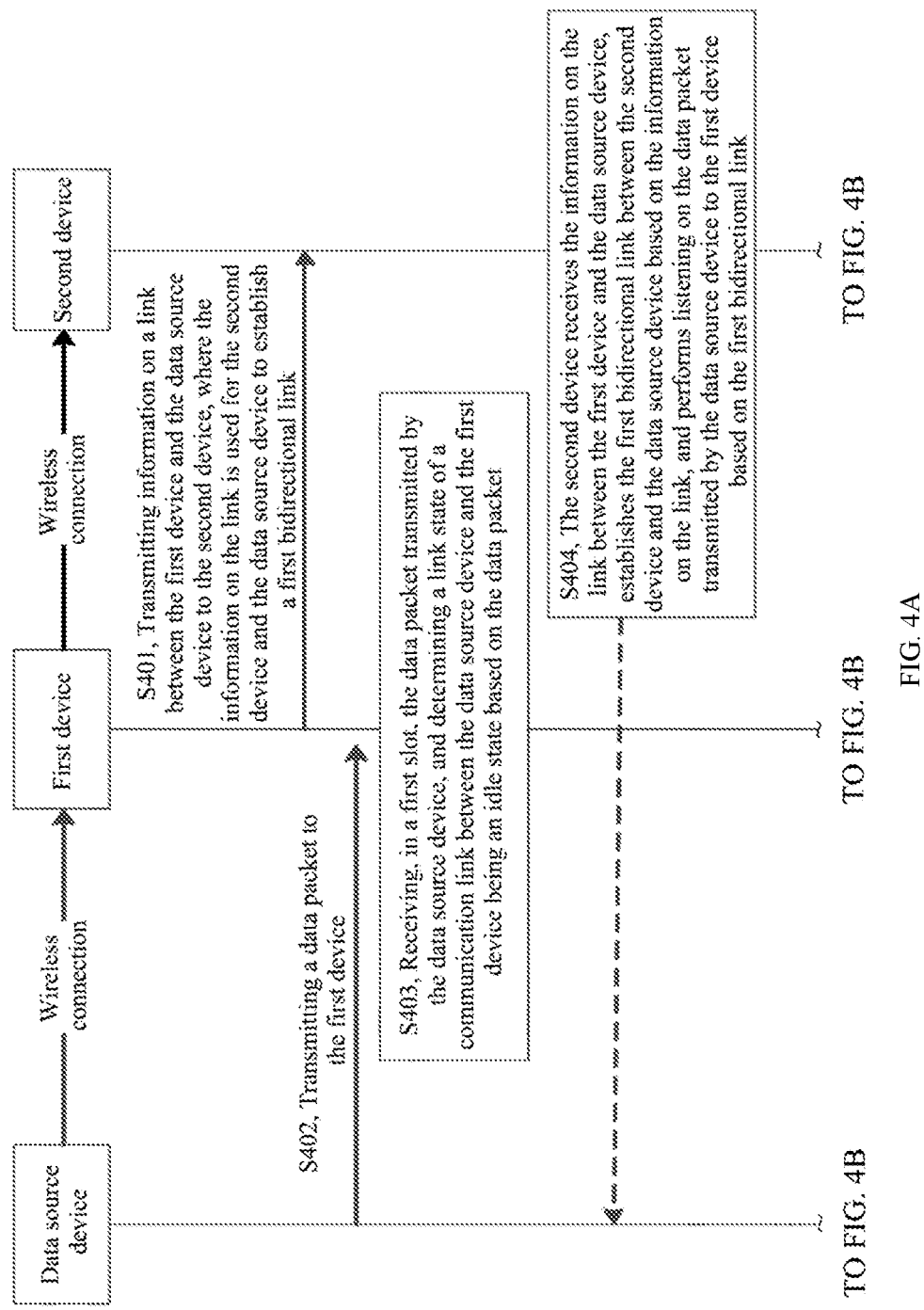

On the basis of the foregoing embodiment, the data transmission method provided in the present disclosure will be further described hereunder with reference to an embodiment of FIGS. 4A and 4B. For details, reference may be made to the embodiment of FIGS. 4A and 4B.

FIGS. 4A and 4B is a third schematic flowchart of a data transmission method according to an embodiment of the present disclosure. As shown in FIGS. 4A and 4B, the data transmission method includes the following steps.

S401, a first device transmits information on a link between the first device and a data source device to a second device, where the information on the link is used for the second device and the data source device to establish a first bidirectional link.

Specifically, the first bidirectional link enables the second device to listen to a data packet transmitted by the data source device to the first device, and feedback confirmation information from a listening result based on a preset condition.

Further, the preset condition may be: transmission of first information to the data source device when the data packet transmitted by the data source device to the first device is not listened by the second device, where the first information indicates no reception of the data packet by the second device; no transmission of the first information to the data source device when the data packet transmitted by the data source device to the first device is listened by the second device.

S402, the data source device transmits a data packet to the first device.

Specifically, the execution method for S402 is the same as the execution method for S301. Here, detailed description of the execution process of S402 is omitted.

S403, the first device receives, in a first slot, the data packet transmitted by the data source device, and determines a link state of a communication link between the data source device and the first device being an idle state based on the data packet.

It should be noted that the execution method according to which the first device receives, in the first slot, the data packet transmitted by the data source device is the same as the execution method for S402. Here, detailed description is omitted with regard to the execution process in which the first device receives, in the first slot, the data packet transmitted by the data source device.

Further, for the execution method in which the first device determines the link state being the idle state based on the data packet, reference may be made to the execution method for S301~S312. Here, detailed description is omitted with regard to the execution process in which the first device determines the link state being the idle state based on the data packet.

S404, the second device receives the information on the link between the first device and the data source device, establishes the first bidirectional link between the second device and the data source device based on the information on the link, and performs listening on the data packet transmitted by the data source device to the first device based on the first bidirectional link.

It should be noted that the second device determines whether the data packet transmitted by the data source device to the first device is successfully listened based on the data packet.

In a possible implementation, the state of the second device is a receiving state after the data packet transmitted by the data source device to the first device is subjected to failed listening by the second device in the first slot. That is, the second device can receive data transmitted by the first device.

S405, the first device transmits an identifier of a current data frame to the second device.

It should be noted that the identifier of the current data frame is an identifier of a most-recent data frame buffered in the first device.

In an embodiment, data frames may have identifiers of consecutive serial numbers, such as 0, 1, 2, etc., or other consecutive data combinations, such as 00, 01, 10, etc. Specifically, specific representations of the identifiers are not limited in the present disclosure.

S406, the second device receives the identifier of the current data frame, and transmits listening information to the first device, where the listening information is used to indicate a receiving state of the second device for N data frames, the N data frames include the current data frame, and N−1 data frames that are positioned before the current data frame and are closest to the current data frame, the receiving state is a successful reception or a failed reception, and N is an integer greater than or equal to 1.

In an embodiment, N can be 1, 2, 3, etc.

In an embodiment, the receiving state may be "1" or "0", where "1" indicates a successful reception and "0" indicates a failed reception; alternatively, the receiving state may be "true" or "false", where "true" indicates a successful reception and "false" indicates a failed reception.

For example, when N is 5 and the receiving state is "1" or "0", the listening information may include 1-1, 0-2, 1-3, 1-4 and 1-5 if serial numbers 1, 2, 3, 4, and 5 are used to identify data frames, where 1-1 indicates a successful reception of a first data frame, 0-2 indicates a failed reception of a second data frame, 1-3 indicates a successful reception of a third data frame, 1-4 indicates a successful reception of a fourth data frame, and 1-5 indicates a successful reception of a fifth data frame.

S407, the first device receives the listening information transmitted by the second device, and determines a data frame that is not listened by the second device based on the listening information.

In an embodiment, the first device has stored therein an identifier of a successfully buffered data frame or an identifier of a buffered data frame, and a receiving state of each data frame (a successful reception).

In an embodiment, the first device may determine a data frame that is not listened by the second device based on the identifier of the successfully buffered data frame (or the identifier of the buffered data frame, and the receiving state of each data frame) and the listening information.

For example, when the first device determines the data frame that is not listened by the second device based on the identifier of the successfully buffered data frame and the listening information, if the listening information includes 1-1, 0-2, 1-3, 1-4 and 1-5 and if 1, 2, 3, 4 and 5 exist in the identifiers of successfully buffered data frames, it can be determined that the data frame that is not listened by the second device is a data frame corresponding to the identifier 2.

S408, the first device transmits to the second device, in the first slot, the data frame that is not listened by the second device.

In an embodiment, the first device may directly transmit to the second device the data frame that is not listened, or may perform modulation, with a preset modulation mode and a preset physical bandwidth, on audio data in the data frame that is not listened, perform data modulation to obtain a data frame that is listened from modulation data and packet header information, and transmit to the second device the data frame that is not listened.

The data transmission method provided in the embodiment of the present disclosure includes: a first device transmitting information on a link between the first device and a data source device to a second device, where the information on the link is used for the second device and the data source device to establish a first bidirectional link; the data source device transmitting a data packet to the first device; the first device receiving, in a first slot, the data packet transmitted by the data source device, and determining a link state of a communication link between the data source device and the first device being an idle state based on the data packet; the second device receiving the information on the link between the first device and the data source device, establishing the first bidirectional link between the second device and the data source device based on the information on the link, and performing listening on the data packet transmitted by the data source device to the first device based on the first bidirectional link; the first device transmitting an identifier of a current data frame to the second device; the second device receiving the identifier of the current data frame, and transmitting listening information to the first device, where the listening information is used to indicate a receiving state of the second device for N data frames, the N data frames include the current data frame, and N−1 data frames that are positioned before the current data frame and are closest to the current data frame, the receiving state is a successful reception or a failed reception, and N is an integer greater than or equal to 1; the first device receiving the listening information transmitted by the second device, and determining a data frame that is not listened by the second device based on the listening information; the first device transmitting to the second device, in the first slot, the data frame that is not listened by the second device. In the above process, the second device performs listening on the data packet transmitted by the data source device to the first device, and the first device transmits to the second device the data frame that is not listened by the second device, thereby reducing the number of data transmitted by the first device to the second device and improving the transmission rate for data transmission by the first device to the second device.

Description is made hereunder to the first slot with reference to FIG. 5 when the data packet received by the first device is of the first type (a POLL type or a NULL type).

FIG. 5 is a slot structure of a first slot according to an embodiment of the present disclosure. As shown in FIG. 5, the first slot 50 includes two slots which are respectively slot 1 and slot 2, where each slot includes two half slots, each of the half slots has a duration of 312.5 microseconds, and each slot has a duration of 625 microseconds.

The first slot 50 occupied by a packet header slot 51 and an idle slot 52 includes 4 slots. It should be noted that the packet header slot 51 generally occupies 126 microseconds and the idle slot 52 generally occupies 1124 microseconds (1.25 milliseconds-126 microseconds). Therefore, the first device can transmit audio data to the second device in the idle slot 52 (1124 microseconds).

Figure 6:
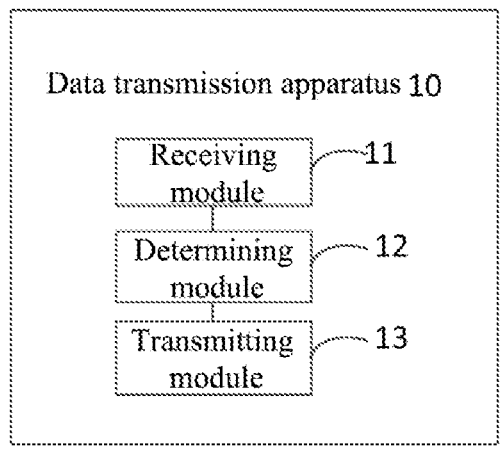
FIG. 6 is a schematic structural diagram of a data transmission apparatus according to an embodiment of the present disclosure.

FIG. 6 is a schematic structural diagram of a data transmission apparatus according to an embodiment of the present disclosure. As shown in FIG. 6, the data transmission apparatus 10 includes a receiving module 11, a determining module 12 and a transmitting module 13, among them:

the receiving module 11 is configured to receive a data packet in a first slot, where the data packet is noise or a data packet received from a data source device;

the determining module 12 is configured to determine a link state between the data source device and the first device based on the data packet, where the link state comprising an idle state or a busy state; and the transmitting module 13 is configured to transmit audio data to a second device in the first slot when the determining module determines the link state being the idle state, where the audio data is audio data received by the receiving module from the data source device.

The data transmission apparatus 10 provided in the present disclosure is applied to the first device in an audio device group, the first device is in a wireless connection with respectively the data source device and the second device, and the second device is a device in the audio device group other than the first device.

The apparatus provided in this embodiment can be used to implement the technical solutions of the foregoing method embodiments; and implementation principles and technical effects therebetween are similar, detailed descriptions are omitted herein in this embodiment.

In a possible design, the determining module 12 is specifically configured to:

determine whether the data packet includes synchronization information and a packet header;

if the data packet does not include the synchronization information and the packet header, determine the link state being the idle state; and if the data packet includes the synchronization information and the packet header, determine the link state based on the packet header of the data packet and/or whether the data packet includes a load.

In another possible design, the determining module 12 is specifically configured to:

acquire first synchronization information in the data packet;

acquire a correlation measure between the first synchronization information and a preset synchronization information; and determine the link state based on the correlation measure.

In another possible design, the determining module is specifically configured to:

determine the link state being the idle state in case of a determination that the correlation measure is less than a first threshold; and determine the link state based on a check result of a check on the packet header in case of a determination that the correlation measure is greater than or equal to the first threshold.

In another possible design, the determining module 12 is specifically configured to:

acquire first check information and second information in the packet header, where the second information is information other than the first check information in the packet header;

generate second check information based on the second information;

determine the link state being the idle state if the first check information and the second check information are different; and determine the link state based on a data packet type in the packet header and/or whether the data packet includes the load if the first check information and the second check information are identical.

In another possible design, the determining module 12 is specifically configured to:

determine the link state being the idle state if the data packet type is a first type or the data packet does not include the load, where the first type is configured to indicate that the data packet does not include the load; and determine the link state being the busy state if the data packet type is a second type or the data packet includes the load.

In another possible design, the transmitting module 13 is specifically configured to:

perform modulation processing on the audio data with a preset modulation mode and a preset physical bandwidth to obtain modulation data;

determine an audio packet based on the modulation data, where the audio packet includes the modulation data and a packet header; and transmit the audio packet to the second device.

In another possible design, the transmitting module 13 is specifically configured to:

transmit an identifier of a current data frame to the second device;

receive listening information transmitted by the second device, where the listening information is used to indicate a receiving state of the second device for N data frames, the N data frames include the current data frame, and N−1 data frames that are positioned before the current data frame and are closest to the current data frame, the receiving state is a successful reception or a failed reception, and N is an integer greater than or equal to 1;

determine a data frame that is not listened by the second device based on the listening information; and transmit, to the second device, the data frame that is not listened by the second device.

In another possible design, the transmitting module 13 is specifically configured to: before transmitting the identifier of the current data frame to the second device, transmit information on the link between the first device and the data source device to the second device, where the information on the link is used for the second device and the data source device to establish a first bidirectional link.

In another possible design, the state of the second device is a receiving state after the data packet transmitted by the data source device to the first device is subjected to failed listening by the second device in the first slot.

In another possible design, the wireless connection is a Bluetooth connection.

In another possible design, the preset modulation mode is quadrature phase shift keying or eight phase shift keying, and the preset physical bandwidth is 2 megahertz with a physical rate of 4 or 6 megabits/second.

The apparatus provided in this embodiment can be used to implement the technical solutions of the foregoing method embodiments; and implementation principles and technical effects therebetween are similar, detailed descriptions are omitted herein in this embodiment.

Figure 7:
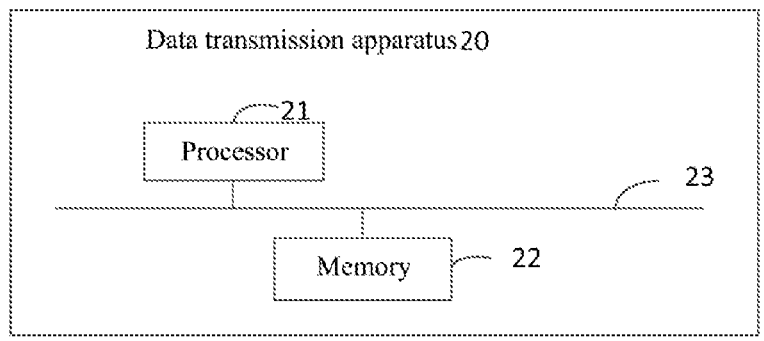
FIG. 7 is a schematic diagram illustrating a hardware structure of a data transmission apparatus according to an embodiment of the present disclosure.

FIG. 7 is a schematic diagram illustrating a hardware structure of a data transmission apparatus according to an embodiment of the present disclosure. As shown in FIG. 7, the data transmission apparatus 20 includes a processor 21 and a memory 22, among them:

the memory 22 is configured to store computer-executable instructions; and the processor 21 is configured to execute the computer-executable instructions stored in the memory, so that the processor executes the data transmission method according to any one of the foregoing method embodiments.

In an embodiment, the memory 22 may be independent or integrated with the processor 21.

When the memory 22 is provided independently, the data transmission apparatus further includes a bus 203 for connecting the memory 22 and the processor 21.

An embodiment of the present disclosure further provides a computer readable storage medium having stored therein computer-executable instructions, where the data transmission method according to any one of the foregoing method embodiments is implemented when the computer-executable instructions are executed by a processor.

In several embodiments according to the present disclosure, it will be appreciated that the disclosed device and method may be implemented in other ways. For example, the aforementioned device embodiments are merely exemplary. For example, the division of the modules is just a division of logical functions, and there may be another division during a practical implementation. For example, multiple modules may be combined or integrated to another system, or some features may be omitted, or they are not executed. Another point is that the shown or discussed mutual coupling, direct coupling or communication connection may be indirect coupling or communication connection through some interfaces, devices or modules, and may be in the form of electrical, mechanical, etc.

The integrated module implemented in a form of software functional module as described above may be stored in a computer readable storage medium. The forgoing software functional module is stored in a storage medium, and includes several instructions to enable a computer device (which may be a personal computer, server, a network device or the like) or a processor to execute part of the steps of the method described in the embodiments of the present disclosure.

It should be understood that the above-mentioned processor may be a central processing unit (CPU for short), or may be other general-purpose processor, digital signal processor (DSP for short), application specific integrated circuit (ASIC for short), etc. The general purpose processor may be a microprocessor or the processor may be any conventional processor or the like. The steps of the method disclosed in conjunction with the present disclosure can be directly embodied as being executed by a hardware processor, or executed by a combination of hardware and software modules in the processor.

The memory may include a high-speed random access memory (RAM) memory, and may also include a non-volatile storage (NVM), such as at least one magnetic disk memory, and may also be a universal serial bus (USB) flash disk, a mobile hard disk, a read-only memory, a magnetic disk, an optical disk, or the like.

The bus may be an industry standard architecture (ISA) bus, a peripheral component interconnect (PCI) bus, or an extended industry standard architecture (EISA) bus, or the like. The bus can be divided into an address bus, a data bus, a control bus, etc. For convenience of representation, the bus in the drawings of the present disclosure is not limited to only one bus or one type of buses.

The foregoing storage medium may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The storage medium can be any available medium that can be accessed by a general purpose or special purpose computer.

Persons of ordinary skill in the art may understand that, all or a part of the steps of the foregoing method embodiments may be implemented by hardware relevant to a program instruction. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc.

Finally, it should be noted that the foregoing embodiments are merely intended for describing the technical solutions of the present disclosure rather than limiting the present disclosure. Although the present disclosure has been described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the spirit and scope of the technical solutions in the embodiments of the present disclosure.

The above descriptions are merely specific embodiments of the present disclosure; however, the protection scope of the present disclosure is not limited thereto. Any modification or replacement that may be readily conceived by persons skilled in the art within the technical scope disclosed by the present disclosure should fall into the protection scope of the present disclosure. Thus, the protection scope of the present disclosure shall be subject to the claims.

What is claimed is:

1. A data transmission method applied to a first device in an audio device group, wherein the first device is in a wireless connection with a data source device and a second device respectively, the second device is a device other than the first device in the audio device group, and the method comprises:

receiving, by the first device, a data packet in a first slot, wherein the data packet is noise or a data packet received from the data source device;

determining, by the first device, a link state between the data source device and the first device based on a determination that whether the data packet comprises synchronization information and a packet header, wherein the link state comprises an idle state or a busy state; and transmitting, by the first device, audio data to the second device in the first slot based on a determination that the first device determines the link state being the idle state, wherein the audio data is audio data received by the first device from the data source device.

2. The method according to claim 1, wherein the determining, by the first device, the link state between the data source device and the first device based on a determination that whether the data packet comprises the synchronization information and the packet header further comprises:

based on a determination that the data packet does not comprise the synchronization information and the packet header, determining, by the first device, the link state being the idle state; and based on a determination that the data packet comprises the synchronization information and the packet header, determining, by the first device, the link state based on at least one of the packet header of the data packet and whether the data packet comprises a load.

3. The method according to claim 2, wherein the determining, by the first device, the link state based on at least one of the packet header of the data packet and whether the data packet comprises the load comprises:
acquiring, by the first device, first synchronization information in the data packet;
acquiring, by the first device, a correlation measure between the first synchronization information and a preset synchronization information; and
determining, by the first device, the link state based on the correlation measure.

4. The method according to claim 3, wherein the determining, by the first device, the link state based on the correlation measure comprises:
determining, by the first device, the link state being the idle state in case of a determination that the correlation measure is less than a first threshold; and
determining, by the first device, the link state based on a check result of a check on the packet header in case of a determination that the correlation measure is greater than or equal to the first threshold.

5. The method according to claim 4, wherein the determining, by the first device, the link state based on the check result of the check on the packet header comprises:
acquiring, by the first device, first check information and second information in the packet header, wherein the second information is information other than the first check information in the packet header;
generating, by the first device, second check information based on the second information;
determining, by the first device, the link state being the idle state based on a determination that the first check information and the second check information are different; and
determining, by the first device, the link state based on at least one of a data packet type in the packet header and whether the data packet comprises the load based on a determination that the first check information and the second check information are identical.

6. The method according to claim 5, wherein the determining, by the first device, the link state based on at least one of the data packet type in the packet header and whether the data packet comprises the load comprises:
determining, by the first device, the link state being the idle state based on a determination that the data packet type is a first type or the data packet does not comprise the load, wherein the first type is configured to indicate that the data packet does not comprise the load; and
determining, by the first device, the link state being the busy state based on a determination that the data packet type is a second type or the data packet comprises the load.

7. The method according to claim 1, wherein the transmitting, by the first device, the audio data to the second device in the first slot comprises:
performing, by the first device, modulation processing on the audio data with a preset modulation mode and a preset physical bandwidth to obtain modulation data;
determining, by the first device, an audio packet based on the modulation data, wherein the audio packet comprises the modulation data and a packet header; and
transmitting, by the first device, the audio packet to the second device.

8. The method according to claim 1, wherein the transmitting, by the first device, the audio data to the second device in the first slot comprises:
transmitting, by the first device, an identifier of a current data frame to the second device;
receiving, by the first device, listening information transmitted by the second device, wherein the listening information is used to indicate a receiving state of the second device for N data frames, the N data frames comprise the current data frame, and N−1 data frames that are positioned before the current data frame and are closest to the current data frame, the receiving state is a successful reception or a failed reception, and N is an integer greater than or equal to 1;
determining, by the first device, a data frame that is not listened by the second device based on the listening information; and
transmitting, by the first device, to the second device, the data frame that is not listened by the second device.

9. The method according to claim 8, wherein before the transmitting, by the first device, the identifier of the current data frame to the second device, the method further comprises:
transmitting, by the first device, information on the link between the first device and the data source device to the second device, wherein the information on the link is used for the second device and the data source device to establish a first bidirectional link.

10. The method according to claim 8, wherein the state of the second device is a receiving state after the data packet transmitted by the data source device to the first device is subjected to failed listening by the second device in the first slot.

11. The method according to claim 1, wherein the wireless connection is a Bluetooth connection.

12. The method according to claim 7, wherein the preset modulation mode is quadrature phase shift keying or eight phase shift keying, and the preset physical bandwidth is 2 megahertz with a physical rate of 4 or 6 megabits/second.

13. A data transmission apparatus, applied to a first device in an audio device group, wherein the first device is in a wireless connection with a data source device and a second device respectively, the second device is a device other than the first device in the audio device group, and the data transmission apparatus comprises: a processor and a memory;
wherein the memory is configured to store computer-executable instructions; and
the processor, when executing the computer-executable instructions stored in the memory, is configured to:
receive a data packet in a first slot, wherein the data packet is noise or a data packet received from the data source device;
determine a link state between the data source device and the first device based on a determination that whether the data packet comprises synchronization information and a packet header, wherein the link state comprises an idle state or a busy state; and
transmit audio data to the second device in the first slot based on a determination that the first device determines the link state being the idle state, wherein the audio data is audio data received by the first device from the data source device.

14. A non-transitory computer readable storage medium having stored therein computer-executable instructions, wherein the computer-executable instructions are executed by a processor, and the processor is applied to a first device in an audio device group, wherein the first device is in a wireless connection with a data source device and a second device respectively, the second device is a device other than the first device in the audio device group, and the following steps are implemented when the computer-executable instructions are executed by the processor:

receiving a data packet in a first slot, wherein the data packet is noise or a data packet received from the data source device;

determining a link state between the data source device and the first device based on a determination that whether the data packet comprises synchronization information and a packet header, wherein the link state comprises an idle state or a busy state; and transmitting audio data to the second device in the first slot based on a determination that the first device determines the link state being the idle state, wherein the audio data is audio data received by the first device from the data source device.

* * * * *